Nov. 4, 1958
H. M. OLSON
2,859,079
TRIPLE SEAL PISTON RING
Filed March 19, 1956
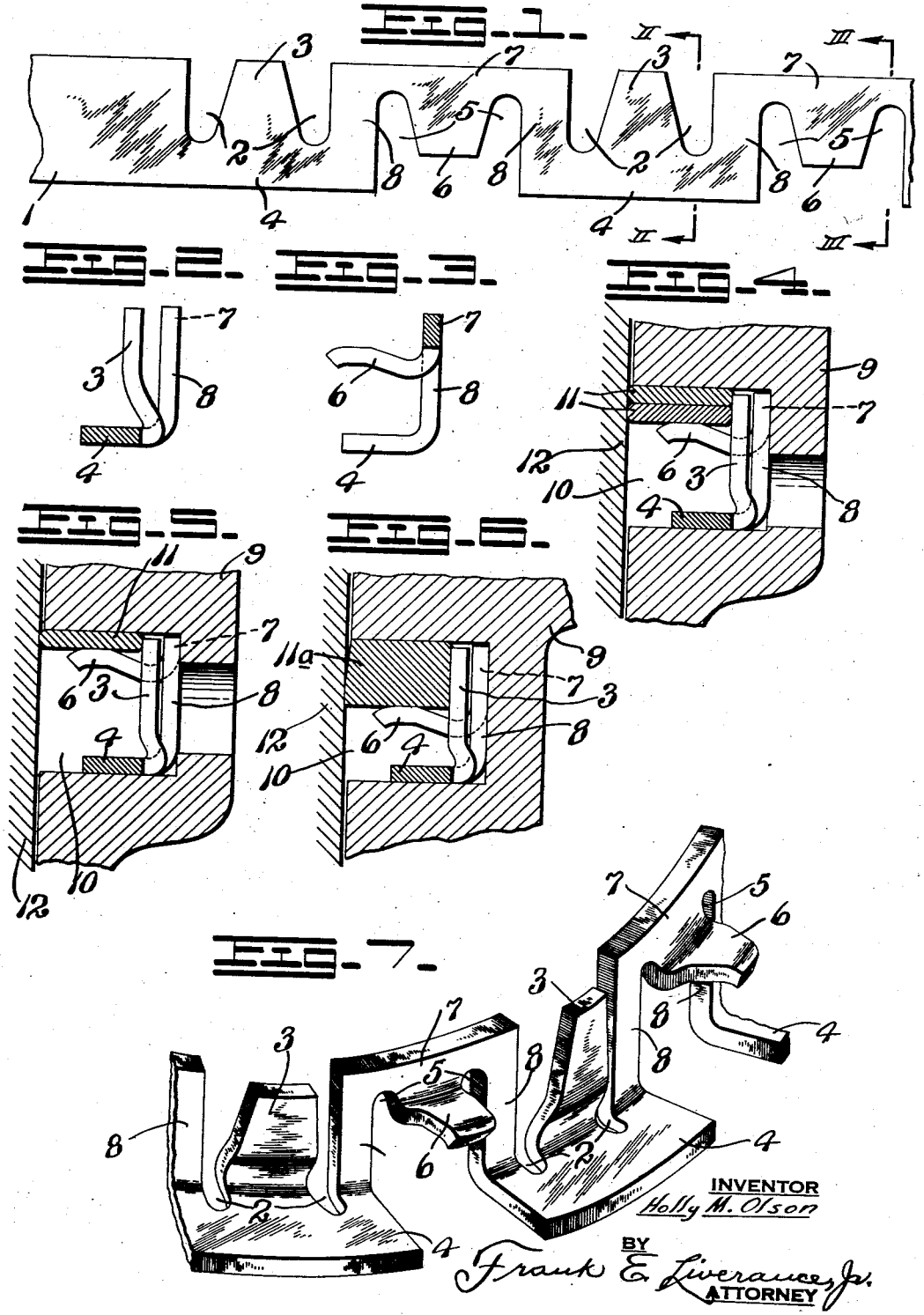
INVENTOR
Holly M. Olson
BY Frank E. Liverance, Jr.
ATTORNEY United States Patent Office 2,859,079
Patented Nov. 4, 1958

2,859,079

TRIPLE SEAL PISTON RING

Holly M. Olson, Muskegon, Mich., assignor to Sealed Power Corporation, Muskegon, Mich., a corporation of Michigan Application March 19, 1956, Serial No. 572,448

7 Claims. (Cl. 309—45)

This invention relates to a novel, useful and very effective piston ring of the type which may be installed in piston ring grooves. With the novel structure which I have provided, the ring member or members which bear against a cylinder wall at their outer edges are held with a yielding pressure against the upper side of the piston ring groove in which located and are pressed outwardly by a yielding pressure against their inner edges. Such piston rings of my invention may be used as oil salvaging and conserving rings or may also be used in the upper ring grooves of a piston, serving the purpose of compression rings.

The continuous yielding pressure exerting against either parted particular rails or parted circular compression rings hold the rails or the rings used against the upper side of a piston ring groove, thereby substantially eliminating the tendency heretofore of the rails or rings, because of inertia conditions and forces developed in a reciprocating piston when it changes direction at the ends of its stroke, to move vertically in its ring groove. The high compression, high vacuum and high speed of present internal combustion engines, particularly those used in motor vehicles, requires that all piston rings and especially oil conserving rings be of a sufficient tension and have a capability of flexing to conform to changing irregularities of the cylinder bore over which the rings move, and work effectively under varying engine operating temperatures and perform their functions of sealing and staying sealed against many variable forces.

My invention of piston ring structure serves as an oil control seal under the severe and variable conditions met with in internal combustion engines, sealing against both compression and vacuum so that lubricating oil is not wasted by passing the piston upwardly to the combustion chamber above the piston, nor blow-by past the piston in the opposite direction. It acts also as a piston stabilizer helping to maintain it with the axis of the piston substantially coincident at all times with the longitudinal axis of the cylinder in which installed during the change of position of connecting rods which connect pistons with the crankshaft. Weight is materially reduced thereby reducing inertia effects, the ring has ring, groove, and piston wear reduced, and improves heat dissipation. The piston ring of my invention also is maintained against turning about the longitudinal axis of the piston, which movement is commonly known as "spinning."

For an understanding of the invention for the attainment of the results stated, reference may be had to the following description taken in connection with the accompanying drawing, in which, Fig. 1 is a plan view of a section of an elongated ribbon of suitable high carbon spring-like and high temperature resistant material showing the first steps followed in the construction of the ring.

Fig. 2 is a transverse section substantially on the plane of line II—II of Fig. 1, looking in the direction indicated, after such length of material shown in Fig. 1 has been bent longitudinally parallel to the edges of the ribbon stock.

Fig. 3 is a like section substantially on the plane of line III—III, being taken in the direction indicated by the arrows, and showing the ring member after it has been formed.

Figs. 4, 5 and 6 are fragmentary vertical sections of a portion of the piston in a cylinder in which located at a ring groove thereof, the piston ring of my invention, in three different forms, being shown in vertical section in such grooves, and Fig. 7 is a much enlarged, short section of the novel piston ring carrier of my invention after it has been shaped and formed to completion.

Like reference characters refer to like parts in the different figures of the drawing.

The ribbon 1 of suitable spring, metallic material is fed through a punch press and at one longitudinal edge of the ribbon, slots 2 in pairs with a tongue 3 between each pair of slots are formed as in Fig. 1. The tongues 3 extend from longitudinal sections 4 at the opposite side edge portions of the ribbon which sections 4 are separated at adjacent ends by other slots 5 cut inwardly from such opposite side edge of the ribbon. A tongue 6 is left between the slots 5 of each pair of such slots integral with sections 7 at the first mentioned side edge of the ribbon, from each of which a tongue 6 projects as shown in Fig. 1. The ends of the opposite longitudinal sections 4 and 7 are integrally connected by transverse legs 8.

Such ribbon is folded or bent lengthwise and parallel to the opposite side edges of the ribbon so that the sections 4 are horizontal and the legs 8 at the inner edges of the sections 4 vertical, the sections 7 connecting the upper ends of the legs 8 being in vertical planes. The tongue 3, one integral with each section 4, is likewise formed and bent as shown in Fig. 2 so as to be located outward of the legs 8 while each tongue 6 is formed and bent to extend generally horizontally outward above and in general parallelism to the lower sections 4.

A piston 9 having a continuous ring receiving groove 10 around it may have the ring member, the construction of which has been described, located therein with the under sides of the horizontal sections 4 against the lower side of the ring groove and the inner vertical sides of the legs 8 and backs of sections 7 against the bottom of the ring groove. Such ring member of course will be parted at one side so that it may be opened to pass over the piston and when put in a piston ring legs 8 and sections 7 will closely contact and may hug the bottom of the ring groove 10.

The tongues 6 extend outward from the lower edges of the sections 7. Above such series of tongues 6, which will be spaced from each other around the ring member described, a thin parted circular metallic rail 11 as in Fig. 5, or two of them as in Fig. 4 may be placed. The inner edges of such rails come against the tongues 3 which, when an installation is made in a cylinder, being bent inwardly by the rails 11, yieldingly react against said rails and force their outer edges with a desired unit pressure against a cylinder wall 12 in which a piston equipped with the piston ring is installed.

In Fig. 6 a parted circular ring member 11a of suitable material for a compression ring, which material will usually be cast iron, is placed above the upward pressing tongues 6, at its inner curved edges against the outwardly pressing tongues 3 and with its outer curved edge against the cylinder wall.

It is evident from the foregoing description a rail 11, or two of the rails as in Fig. 4, will be forced upwardly by the spring tongues 6 causing the upper side of either a single rail or the outermost side of the two rails in Fig.

4 to seal against passage of lubricant from the ring groove over the upper side of the rail or ring, and similarly will seal against the passage of compressed gases, that is, blow-by past the rails or the ring member used so as to go below the piston ring. The legs 8 and the sections 7 form a stable support against the bottom of the ring groove, and the sections 4 a similar support against the lower side of the ring groove.

By such construction, the piston is held and stabilized against rocking or slapping. There are ample vents for the passage of lubricant from the ring groove through the normal passages leading from the bottom of the ring grooves to the interiors of the pistons in connection with oil salvaging rings as in Figs. 4 and 5, and the unit pressure of either a rail 11 or ring member 11a against a cylinder wall may be controlled in connection with the materials used and extent to which they are strained when installed with the thin rails 11 or the ring member 11a in an internal combustion engine. In addition, a piston ring structure in accordance with the disclosure of my invention is of a reduced weight, lessening inertia forces. The piston ring structure is sturdy and durable and has a long life in service. With the outer cylinder engaging edges of the rails 11 or ring member 11a suitably chromium plated, wear upon the piston ring is reduced and there is also a reduction in ring groove and piston wear together with a maximum of effective service in the matter of maintaining oil consumption low.

The invention is defined in the appended claims and is to be considered comprehensive of all forms of structure coming within their scope.

I claim:

1. In a piston ring, a circular ring member adapted to be received in a piston ring groove comprising, a plurality of circularly disposed, spaced, flat, horizontal sections, two spaced legs integral with and extending vertically from the inner edge portion of each horizontal section, and integral upper sections connecting the legs of adjacent horizontal sections at the upper ends thereof, each horizontal flat section at its inner edge portion having an integral, generally vertical, spring tongue positioned outwardly beyond adjacent legs between which located, and each upper section having an outwardly extending, generally horizontal, spring tongue, said last mentioned tongues being located over the spaces between said horizontal flat sections and said first mentioned spring tongues extending upwardly beyond said second mentioned spring tongues.

2. In a piston ring, a plurality of flat horizontal sections, spaced from each other at the ends thereof and together with the spaces between sections having a generally circular outline, integral vertically located inverted U-shaped members connecting said horizontal sections at the inner edge portions thereof, a generally vertical spring tongue at the inner edge portion of each horizontal section, said tongues being between successive U-shaped members and at their upper portions being located outwardly therefrom, a generally horizontal, spring tongue connected with and extending outwardly from the upper portion of each inverted U-shaped member, the upper sides of said horizontal tongue all being substantially in the same horizontal plane, and a separate ring member resting against the upper sides of said horizontal tongues, said vertical tongues extending upwardly to said ring with their upper end portions bearing outwardly against the inner curved edge of said ring member.

3. Structure as described comprising, a generally circular member having means adapted to rest upon and bear against the lower side of a piston ring groove and having additional means adapted to lie against the bottom of said groove, yielding means generally paralleling said first means connected with said second means and extending outwardly, a separate ring located upon said yielding means and adapted to be yieldingly pressed thereby to engage said ring against the upper side of said piston ring groove, and a second yielding means connected with said member and yieldingly pressing outwardly against the inner edge of said ring.

4. In a piston ring, a circular carrier having lower, horizontally located members adapted to bear against the lower side of a piston ring groove, and vertical members at the inner edges of the horizontal members adapted to seat against the bottom of said groove, a plurality of spaced generally vertically located spring members around said carrier connected therewith having yielding free end portions located outwardly from said vertical members, and a plurality of spaced outwardly, generally horizontal spring members connected with said carrier, said horizontal spring members lying generally in the same horizontal plane and being located between said horizontal members and the upper ends of said vertical members.

5. In a piston ring, a circular parted ring member, and a separate circular carrier therefor comprising, horizontal supporting means adapted to rest against the lower side of a piston ring groove, and vertical means adapted to bear against the bottom of said groove, a spaced plurality of generally horizontal, outwardly extending spring members on said vertical means, against the upper sides of which the piston ring member is located, and a spaced plurality of spring means on said carrier engaging and normally pressing against the inner curved edges of said piston ring member.

6. In a piston ring, a generally circular ring member, and a separate circular carrier therefor having portions adapted to seat against the lower side of a piston ring groove, and other portions at right angles to the first mentioned adapted to seat against the bottom of said groove, means on said carrier yieldingly engaging against the inner edges of said ring member, and means supporting and bearing against the under side of said ring member adapted to yieldingly press said ring member upwardly against the upper side of said piston ring groove.

7. In a piston ring, a generally circular ring member, and a separate circular carrier therefor having yielding supporting means for carrying said ring member on and above said supporting means, and yielding expanding means on said carrier against the inner sides of the said ring member, said ring member being located so as to be adapted to bear at its upper side against the upper side of a piston ring groove which the piston ring is installed.

References Cited in the file of this patent

UNITED STATES PATENTS

| | | |
|---|---|---|
| 2,621,989 | Norton | Dec. 16, 1952 |
| 2,636,792 | Olson | Apr. 28, 1953 |